US011479920B1

(12) United States Patent
Vizcaino et al.

(10) Patent No.: US 11,479,920 B1
(45) Date of Patent: Oct. 25, 2022

(54) METHOD FOR MAINTAINING WOOD RAILROAD TIES

(71) Applicant: Railroad Solutions, Inc., Denver, CO (US)

(72) Inventors: Walter Vizcaino, Centennial, CO (US); Michael Raab, Littleton, CO (US)

(73) Assignee: Railroad Solutions, Inc., Denver, CO (US)

( * ) Notice: Subject to any disclaimer, the term of this patent is extended or adjusted under 35 U.S.C. 154(b) by 0 days.

(21) Appl. No.: 17/850,935

(22) Filed: Jun. 27, 2022

Related U.S. Application Data

(62) Division of application No. 17/394,142, filed on Aug. 4, 2021, and a division of application No. 16/997,109, filed on Aug. 19, 2020, now Pat. No. 11,255,053.

(60) Provisional application No. 62/888,760, filed on Aug. 19, 2019.

(51) Int. Cl.
| | | |
|---|---|---|
| *C08L 95/00* | (2006.01) | |
| *E01B 31/26* | (2006.01) | |
| *E01B 9/16* | (2006.01) | |
| *E01B 9/06* | (2006.01) | |
| *C09D 5/34* | (2006.01) | |
| *B05B 13/02* | (2006.01) | |
| *B05C 5/02* | (2006.01) | |
| *B05C 11/10* | (2006.01) | |
| *B27M 3/14* | (2006.01) | |
| *C08K 3/38* | (2006.01) | |

(52) U.S. Cl.
CPC .............. *E01B 9/06* (2013.01); *B05B 13/02* (2013.01); *B05C 5/0212* (2013.01); *B05C 5/0279* (2013.01); *B05C 11/1044* (2013.01); *B27M 3/14* (2013.01); *C08K 3/38* (2013.01); *C08L 95/00* (2013.01); *C09D 5/34* (2013.01); *E01B 31/26* (2013.01); *B05B 13/0278* (2013.01); *C08K 2003/387* (2013.01); *C08L 2555/52* (2013.01); *E01B 9/16* (2013.01); *E01B 2201/10* (2013.01)

(58) Field of Classification Search
CPC ....... C08L 95/00; C08L 2555/52; B27M 3/14; E01B 31/26; E01B 9/16
See application file for complete search history.

(56) References Cited

U.S. PATENT DOCUMENTS

| | | | | |
|---|---|---|---|---|
| 2,568,765 | A * | 9/1951 | Roon | C09D 5/34 |
| | | | | 106/236 |
| 2,769,730 | A | 11/1956 | Sakornbut | |
| 2,940,942 | A * | 6/1960 | Hodenfield | C08L 95/00 |
| | | | | 424/676 |
| 3,808,164 | A * | 4/1974 | Gulino | C08L 95/00 |
| | | | | 106/272 |
| 4,070,201 | A * | 1/1978 | Tessenske | F16B 13/142 |
| | | | | 238/371 |
| 4,152,185 | A * | 5/1979 | Tessenske | E01B 31/26 |
| | | | | 238/370 |
| 4,723,389 | A | 2/1988 | Kousek et al. | |
| 4,907,917 | A | 3/1990 | Leibhard | |
| 5,397,202 | A | 3/1995 | Shrader et al. | |
| 6,255,370 | B1 | 7/2001 | Vizcaino et al. | |
| 9,617,692 | B2 | 4/2017 | Brenny et al. | |
| 2004/0166246 | A1 | 8/2004 | Holcomb | |
| 2006/0089430 | A1 | 4/2006 | Kawakami | |
| 2012/0148857 | A1 | 6/2012 | Smith | |
| 2015/0101504 | A1 | 4/2015 | Brenny et al. | |

FOREIGN PATENT DOCUMENTS

GB         12645 A  *  7/1903

* cited by examiner

*Primary Examiner* — Karuna P Reddy
(74) *Attorney, Agent, or Firm* — Patricia C. Brzostowicz; Superior Patent Group, LLC

(57) ABSTRACT

A method for maintenance of railroad wood ties is presented herein. The wood filler composition used in the method is applicable for filling holes or gaps in wood to stabilize wood structures. The composition comprises at least unintahite, also known as asphaltum or Gilsonite, and sand. The composition may further comprise a water repellant and a wood preservative. The composition is non-carcinogenic. The method comprises filling a hole with the dry composition described herein. The wood member may be a railroad tie and using an appropriate filling device, at least two holes, or at least four holes may be filled at one time.

20 Claims, 18 Drawing Sheets

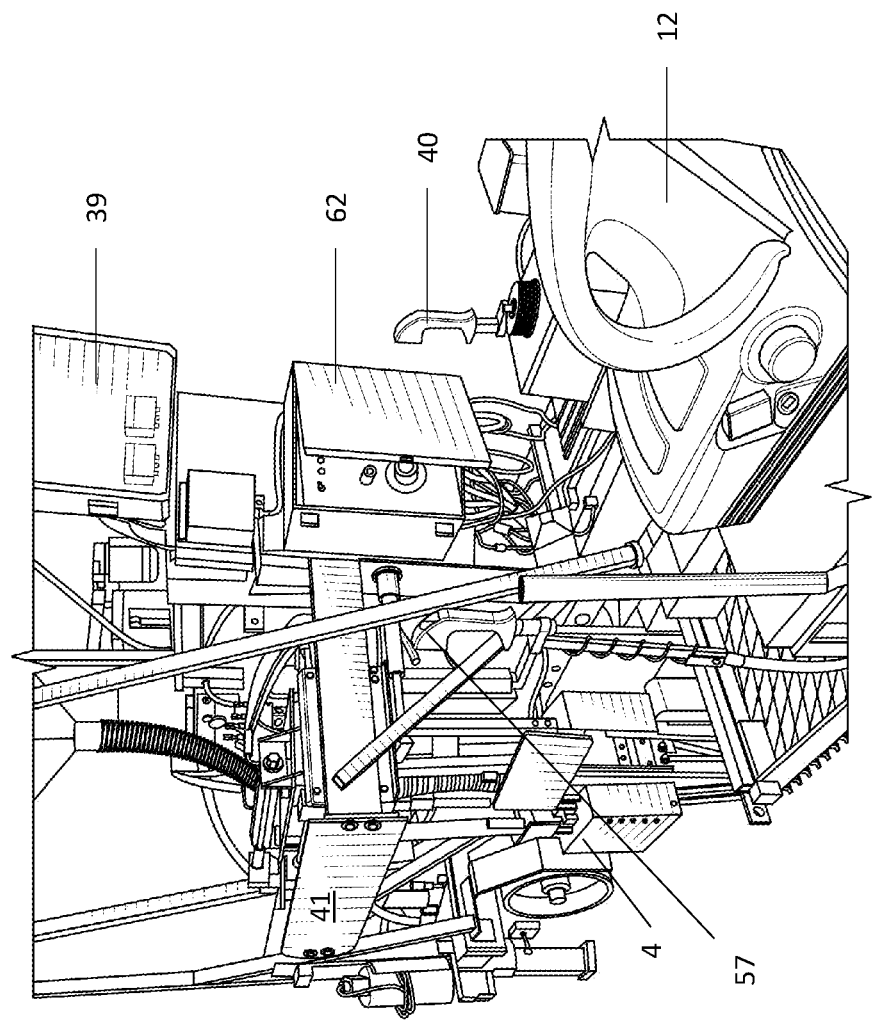

METHOD FOR MAINTAINING WOOD RAILROAD TIES

RELATED APPLICATIONS

The following is an application under 35 USC 111 (a). This application claims priority to U.S. Provisional Application No. 62/888,760 filed Aug. 19, 2019 and priority to U.S. Ser. No. 16/997,109 filed Aug. 19, 2020. The present application is a divisional application of U.S. application Ser. No. 17/394,142 filed Aug. 4, 2021 and also claims priority to U.S. Ser. No. 16/997,109 with the same applicant.

FIELD

This invention relates to a method for improving retention of anchors in wood structures, filling holes left by anchors in wood structures to maintain structural integrity of the structure, and more particularly, to methods for removing, driving, and replacing railroad spikes in wood cross ties.

BACKGROUND

The railroad industry has historically been plagued by the loosening and loss of rail spikes from wood cross ties, and periodically undertaken a variety of efforts to improve spike/tie interface. Spike loss is caused by the lateral and vertical movement of a rail under load that creates ratcheting effect on the rail spike and the tie. This ratcheting eventually results in loosening and dislodgement and loss of the spike causing the wood cross tied and rail plate connecting the tie to the rail line to become loose and rail above it to be unstable. When this happens, the spikes must be replaced to maintain integrity and safety of the rail lines.

The traditional industry standard method for replacing missing spikes involves driving a wooden plug into the whole left by the lost spike and inserting a new spike into the wooden plug. This means of replacement leaves the cross tie susceptible to loss of the spike via the constant ratcheting effect due to movement of trains over the rails. Railroads must constantly survey for and replace lost spikes to keep the rail lines in safe operating condition. Spikes must be replaced when rail or gauging is replaced for railroads to be in compliance with Federal Railroad Administration (FRA) rules.

Wood railroad cross ties are treated typically with creosote to prevent erosion, splitting, and wood rot. A properly treated tie can last up to twenty-five years depending on weather and environmental conditions. Once a spike is driven into the tie, the area around the spike is exposed to elements and is more susceptible to wear due to ratcheting forces. This untreated exposed area around the spike captures moisture and is open to invasion by living organisms many of which may be microscopic. Further water freezing and thawing in the wood leads to degradation of the wood fiber and rot around the spike weakening the bond between the spike and cross tie. This degradation around the spike shortens the useful life of the tie leading to premature replacement. Weakened cross ties are hazardous and must be constantly inspected and replaced if weak. Spike and cross ties maintenance and replacement cost much employee time and material expenses for the rail industry.

Various mechanical means of improving rail spike retention have been employed but have done little to address the issue of tie degradation around a spike and have met with limited success. Several compounds including a low viscosity resin, as described in U.S. Pat. No. 4,706,806, expandable dowel compound as described in U.S. Pat. No. 4,723,389, flowable hardening bonding mass as in U.S. Pat. No. 4,907,917, and bonding material described in U.S. Pat. No. 5,397,202. These however are not readily adaptable to wood rail cross ties, involve two stage applications and/or require external application of heat for mixing the compounds and thus special tools on site. Moreover, many of these compounds by nature are harmful to the environment.

More recently a composition for rail spike retention has been employed. This dry mixture described in U.S. Pat. No. 6,255,370 required no special tools for application and heat generated by the driving of the spike into the aperture effected amalgamation and dispersion in the spike aperture. The dry mixture included ground aromatic hydrocarbon materials being 25-45% by weight petroleum pitch, 50-70% sub-angular silica sand having grade of between 35 and 100 mesh, and a hydrocarbon resin adhesive being coumarone-indene resin on silicon dioxide at 1-10% of the final composition.

The current method of filling holes left following extraction of metal spikes from wood cross ties is hand-held application of filler material. A hopper contains material and a person opens a valve to dispense a compound of choice into the hole one at a time. What is needed in the art is an efficient, fast, environmentally friendly, and robust devices, systems, and methods for preserving wood cross ties and holding spikes securely in place in order to ensure safety and longevity of rail lines.

SUMMARY

The present disclosure comprises a device for filling holes in wood with a wood filler composition, the device comprising: a device for filling a hole in wood with a wood filler composition comprising a system for moving an attached product dispensing system in an x, y, and z direction, wherein the x, y, and z directions are orthogonal with respect to one another; the product dispensing system comprising a product vessel, wherein the product vessel is designed to contain the wood filler composition and at least two dispensing units, a dispensing unit comprising a rod control valve, a rod, and a product tubing, wherein the raising of the rod by the rod control valve allows the wood filler composition contained in the vessel to flow into the product tubing, and at least two dispensing nozzles housed on the vessel and connected to the product tubing such that the wood filler composition may flow from the product tubing through the dispensing nozzles to fill at least two holes at one time. The system for moving an attached product dispensing system in one example may be pneumatic. In another example the system for moving an attached product dispensing system may be hydraulic. The product dispensing system may be pneumatic or in another example the product dispensing system may be hydraulic.

The disclosed device may comprise at least three product dispensing systems and nozzles, or at least four, or at least five, or at least six, or at least seven, or at least eight or more dispensing systems and nozzles to accomplish filling at least eight or more holes at one time. The dispensing nozzle(s) may swivel or rotate with respect to the bottom of the product vessel in order to allow precise delivery of the wood filler composition. The angle or range of motion of the swivel of the nozzle may be at least 5° from a ninety-degree angle from the plane of the bottom of the product vessel, or at least 10°, or 20°, or 30°, or 35°, or as much as 37°. Product dispensing tubes or lines may be attached to the nozzles to allow accurate filling of holes.

Amount of product delivered to holes may be adjusted with the rod control valve. A guiding system may be included in the device to allow accurate filling of the holes by moving the dispensing system in the x, y, and z directions. The device may further comprise a hydraulic system to propel the device along the rails. The device may further comprise a motor or engine attached thereto to power the electrical, hydraulic, and/or pneumatic systems. The device may further comprise wheels. These wheels may be designed to roll on railroad lines. A braking system may be included on the device. The device may further comprise a product container or hopper for housing additional wood filler composition. A product delivery tube or line may transfer the composition from the hopper to the product dispensing system. Product delivery may be via gravity feed or other means such as air conveyance.

The disclosure further comprises a wood filler composition, the composition being Gilsonite and sand. The Gilsonite may be sourced from the Uintah Basin and be present in the composition in at least 25%, or at least 30%, or at least 35% by weight. The sand may be angular in shape and have a Mohs' Hardness of at least 5. The sand may be present in the composition in at least 60%, or at least 70% by weight of the composition. The wood filler composition may further comprise a water repellant. The water repellant may be zinc or a zinc compound and may be present in the wood filler composition comprising at least 2% by weight of the composition. The wood filler composition may further comprise a wood preservative.

The disclosure further includes a method for filling rail spike holes simultaneously, the method comprising the steps of: a method of filling rail spike holes simultaneously comprising mixing Gilsonite and sand to form a wood filler composition, applying the wood filler composition in at least two rail spike holes at a time, wherein the applying comprises filling at least two wood filler dispensers with the wood filler composition, positioning the wood filler dispensers over the at least two rail spike holes, and releasing the wood filler composition into the at least two rail spike holes.

DESCRIPTION OF THE DRAWINGS

FIG. 16 is a close-up back side view of a portion of the disclosed device.

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

Figure 1:
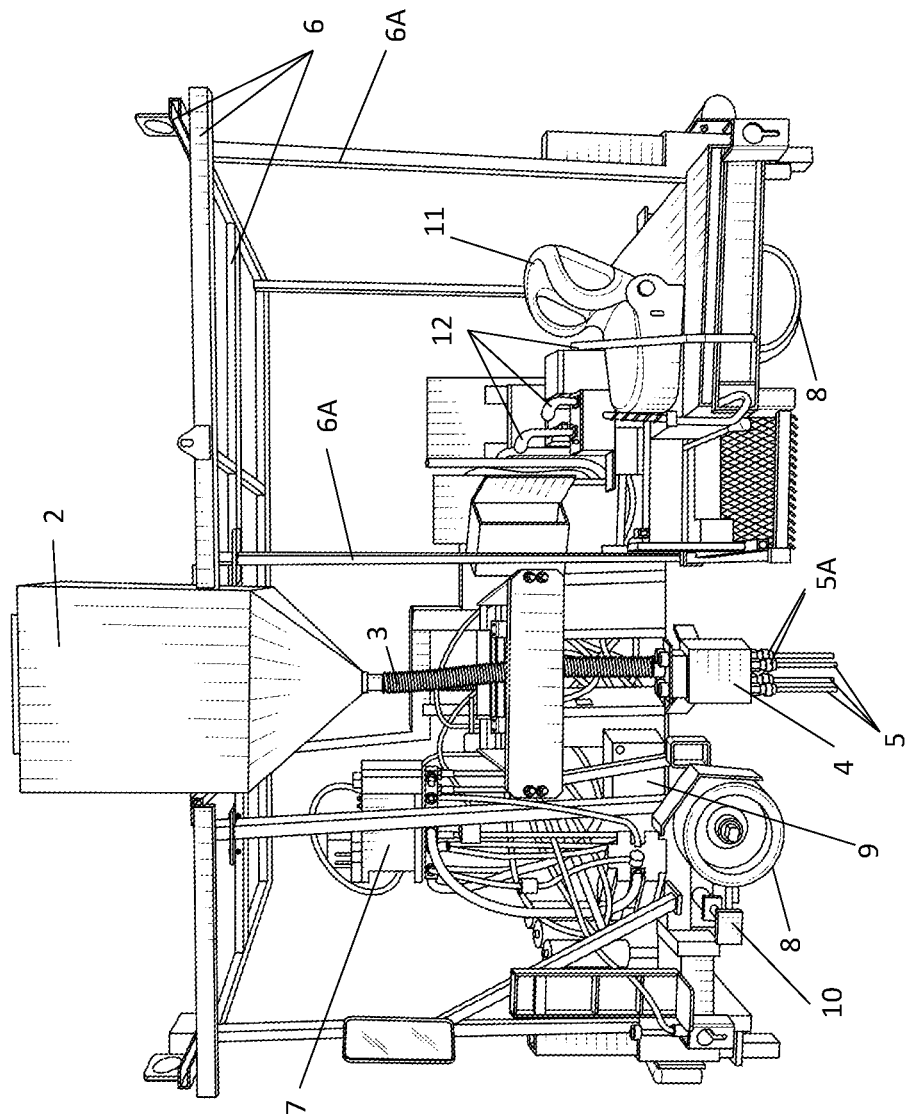
FIG. 1 is a drawing of a right side view of the disclosed device for filling spike holes.

FIG. 1 is a drawing of the disclosed rail spike hole filler delivery device or system 1 for filling multiple rail spike holes at one time with a wood filler composition. The disclosed delivery system comprises a product hopper or tank 2, product line 3, product distribution box 4, delivery nozzles 5A, and delivery tubes 5. The device or system 1 and product tank 2, product line 3, product distribution box 4, delivery nozzles 5A, and delivery tubes 5 may be formed from a choice of several products including metals, metal alloys, ceramics, and/or plastics, rubber, being natural or synthetic, or blends thereof being materials designed to hold solids and liquids in a space and support weight and perform actions of various components. The system or device may further comprise a frame 6 and roof support arms 6A being constructed from a single or multiple pieces of metal, metal alloys, ceramic, or appropriate plastic material designed to support weight of the system. Further, the device may comprise a mechanism or mechanisms to move the device of the rails and may comprise a system that includes a hydraulic tank 7 for a hydraulic system. Alternate means of propelling the system along or over the rails may include a motor or engine. The device 1, and its hydraulic, pneumatic, and electric systems, may be powered by a motor or engine (not shown in this view), being gasoline, natural gas, electric, or diesel, or alternately be powered by battery or other means. The device may for instance be solar or wind-powered. Wheels 8, such as railroad wheels, designed to carry the device on rail lines (not shown) may be included in the system 1. Alternately the wheels 8 may be designed to straddle the rail lines, fitting outside or inside the rail lines. Appropriate mechanical devices to connect the motor to the wheels may include a drive line or drive train 9. There may be at least two wheels on the vehicle, or at least three, or at least four. A braking system 10 may also be included in the device 1. An operator chair 11 and operator controls 12 may be included to provide control of device altering speed along or over the rail lines and/or control of the delivery system. The drive train and braking system in one example are hydraulic.

Figure 2:
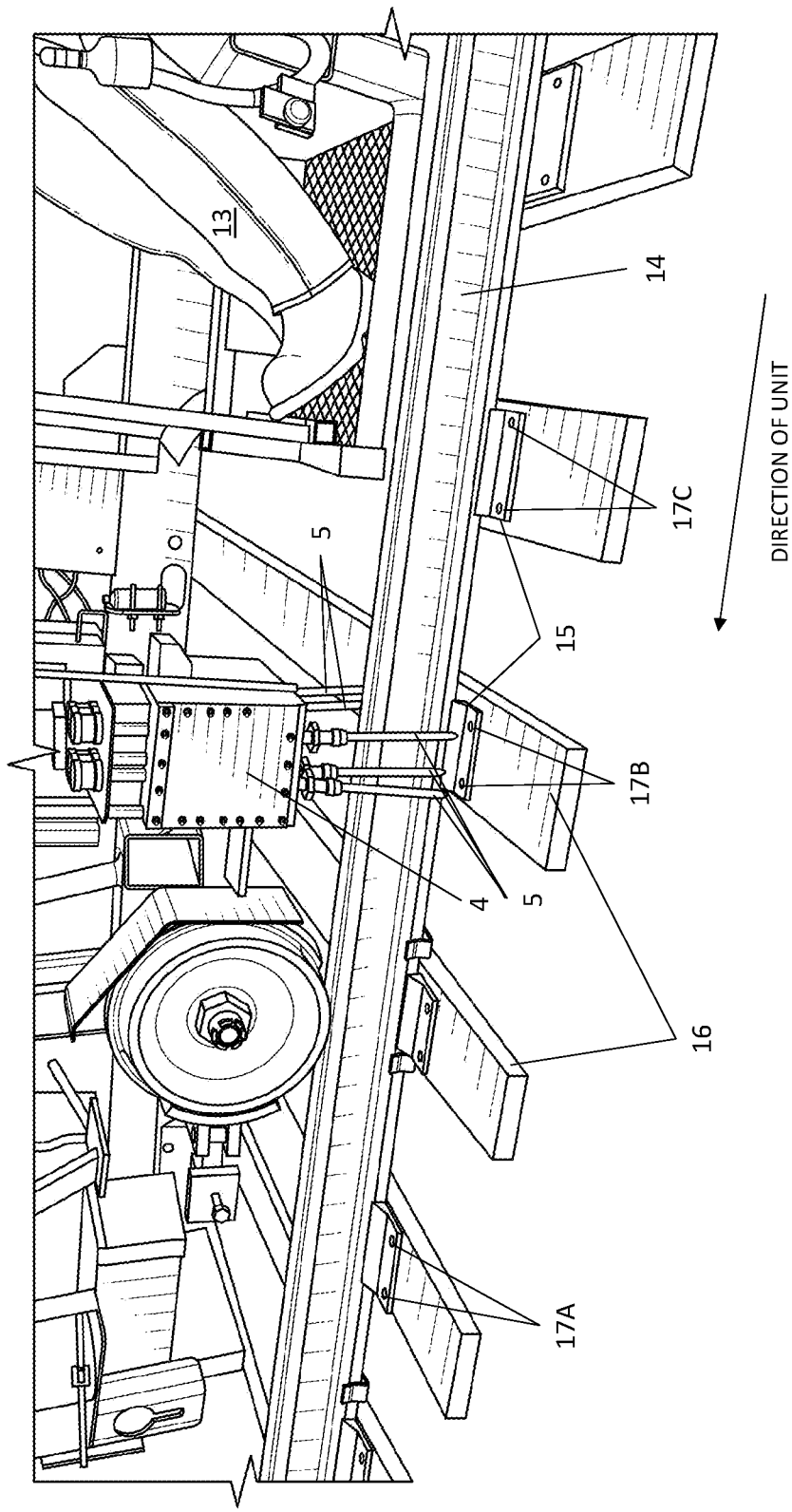
FIG. 2 shows a portion of the disclosed device for filling spike holes in use.

FIG. 2 shows a portion of the disclosed delivery system and device for filling spike holes. An operator 13 may guide the device over the rail(s) 14 to align the delivery tubes 5 with holes 17B in a rail tie plate 15. Rail tie plates 15, being generally fashioned from metal, connect the rails 14 to wood railroad cross ties 16. Rail spikes 17A or screws function to hold the rail tie plate 15 to the wood cross ties 16. When the wood cross ties 16 or rail spike 17A is compromised, the wood cross ties 16 becomes rotted or soft, rail spikes 17A need to be replaced and/or reseated in the wood cross ties 16. The disclosed wood filler composition, described further below, is housed in the product tank 2 (not shown) and fed down through the product line 3 (not shown) to the product distribution box 4, where a portion of the wood filler composition is dropped or fed by the delivery tubes 5 into the holes 17B made when the old rail spikes 17A are removed. The wood filler composition delivery device may be positioned, by the operator 13 or some other method, such that the delivery tubes 5 align with the holes 17B vacated by the rail spikes 17A and deliver a set amount of wood filler composition to the hole. Following filling the holes 17B, new rail spikes are inserted 17C.

Figure 3:
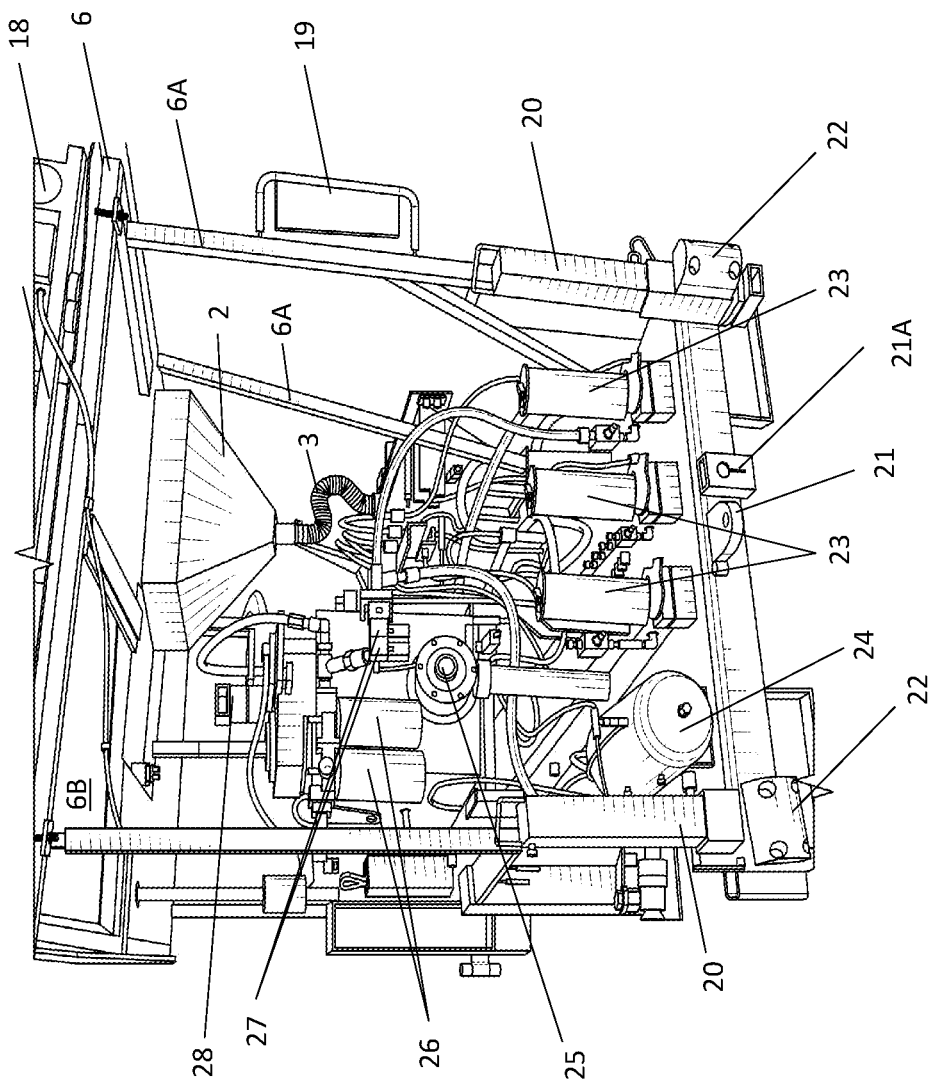
FIG. 3 is a drawing of a front view of the disclosed device for filling spike holes.

FIG. 3 is a drawing of a front view of a portion of the disclosed device for filling spike holes. The product tank 2 sits at the right side of the device in this view, with product line 3 attached to the bottom such that product can be delivered to the product distribution box (now shown in this view) via gravity feed or other means appropriate. A frame 6 supports the delivery system including the product tank 2 and other devices for moving the device 1 and the product distribution box (not shown) into the correct location over the rail lines. Roof support arms 6A support a roof 6B. Light(s) 18 and mirror(s) 19 maintain safety for the operator and other workers. The device may include a jack stand 20, tow point 21, chain-up point 21A, an impact bumpers 22. The hydraulic system further includes hydraulic filters 23. The device further may comprise a pneumatic air storage tank 24, hydraulic shut off valve 25, hydraulic pre-filters 26, pneumatic air control valves and dryer 27, and a hydraulic air tank dryer 28. In on example the hydraulic system propels the device either forward or backward over the rails. In another example the hydraulic system may also move the product dispensing system in the x, y, and z directions as described below and move the parts of the product dispensing system itself. In yet another example the pneumatic system may move the product dispensing system in the x, y, and z directions as described below and move the parts of the product dispensing system itself as well.

Figure 4:
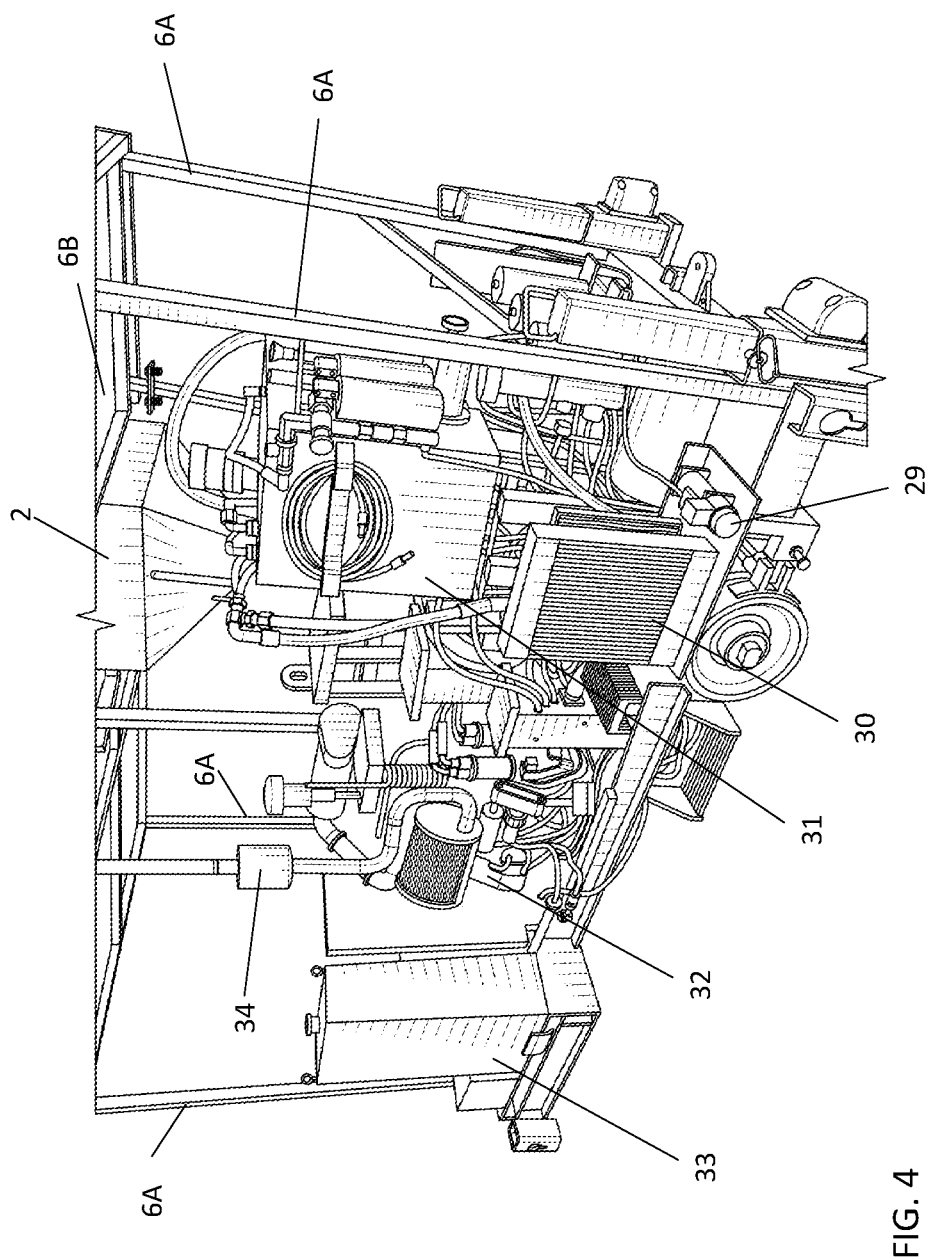
FIG. 4 is a drawing of a left side view of the disclosed device for filling spike holes.

FIG. 4 is a drawing of a left side view of portion of the disclosed device for filling spike holes. Roof supports 6A support a roof 6B. The product tank 2 sits on the opposite or right side of the device. In this view additional components needed for the hydraulic and pneumatic systems are visible including the pneumatic air compressor 29, hydraulic cooler 30, and hydraulic tank 31. In one example, as will be shown in more detail later, the pneumatic system moves the product distribution box into position over the rail spike holes. It can be envisioned that other means of power may be utilized for moving the box the hydraulic system, or by electric or other means such as a motor or engine. A diesel engine 32 powers the hydraulic, pneumatic, and electrical systems of the device. It may be envisioned that a different type of engine or motor could be utilized to power the device moving it over the rails. A fuel tank 33 holds diesel fuel for the diesel engine 32 and an exhaust pipes runs therefrom 34.

Figure 5:
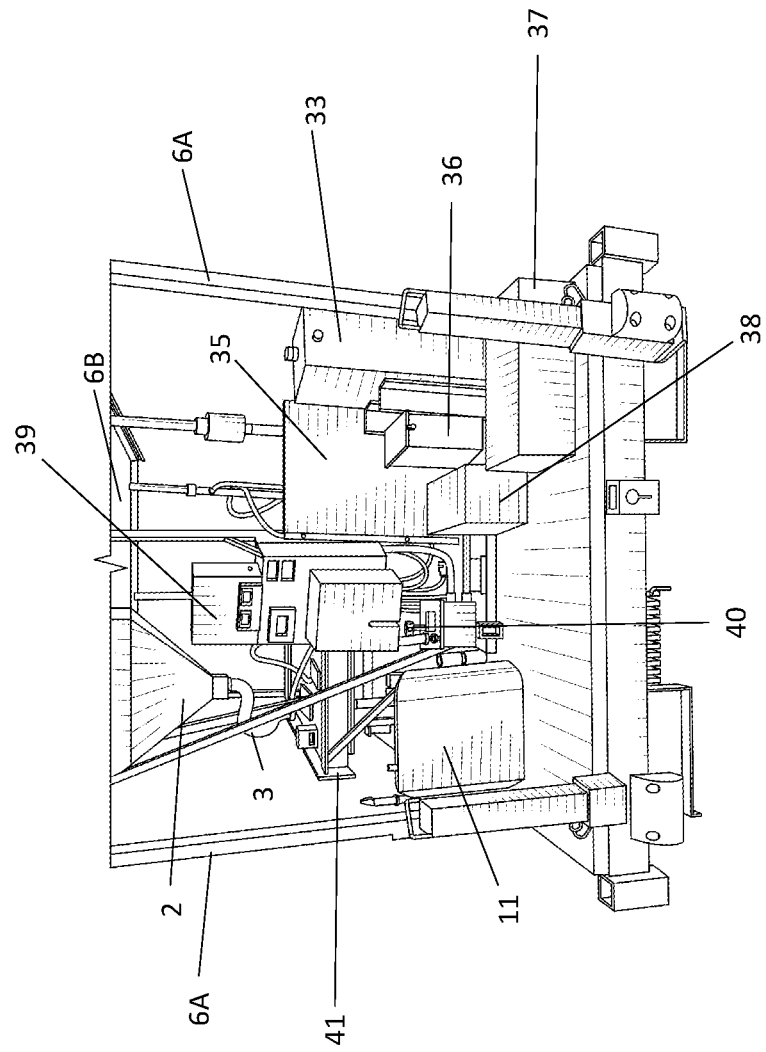
FIG. 5 is a drawing of a back view of the disclosed device for filling spike holes.

FIG. 5 is a drawing of a back view of a portion of the disclosed device for filling spike holes. The roof supports 6A support the roof 6B. A fuel tank 33 holds diesel fuel for the diesel engine (not shown). An engine sound dampening wall 35 improves working conditions for the operator (not shown). The unit may include additional storage boxes 36 and a unit counter-weight 37 to balance the device. Further a battery box and batteries 38 may be utilized to power electric components and/or store energy from an engine or motor. A pneumatic air system control box 39 controls the pneumatic system and an xyz operator hand control arm 40 allows the operator to move the product distribution box (not shown) in x, y, and z planes or directions to fill the spike holes. The operator may sit in a chair 11 or seat to operate the device, moving it over the rails, positioning the product distribution box and controlling product delivery.

Figure 6:
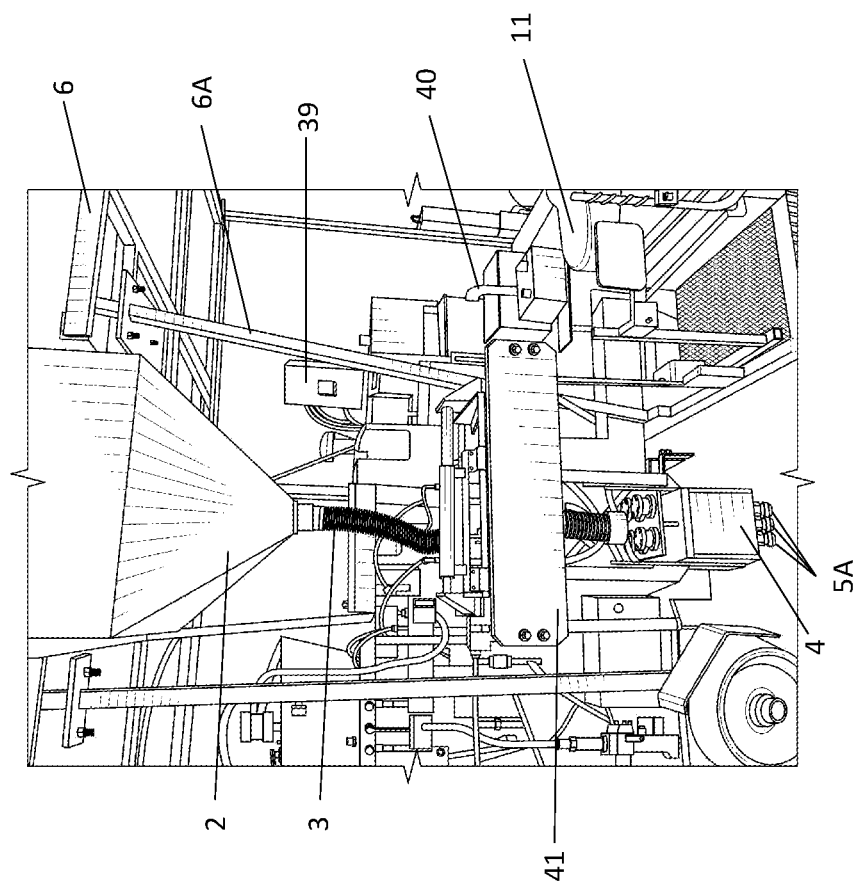
FIG. 6 is a drawing of a portion of the filler device and system of the disclosed device.

FIG. 6 is a drawing of the product delivery device and system for filling spike holes. The product delivery system is supported by a frame 6 and roof supports 6A. The product tank 2 holds the wood filler composition of the present disclosure. The wood filler composition falls into the product line 3 and fills the product distribution box 4. A frame or head unit 41 supports the product distribution box and allows it to move in the x, y, and z directions as controlled by the xyz operator hand control arm 40 shown in more detail following. Product delivery nozzles 5A connect to delivery tubes (not shown). The air system control box 39 controls the pneumatic system.

Figure 7:
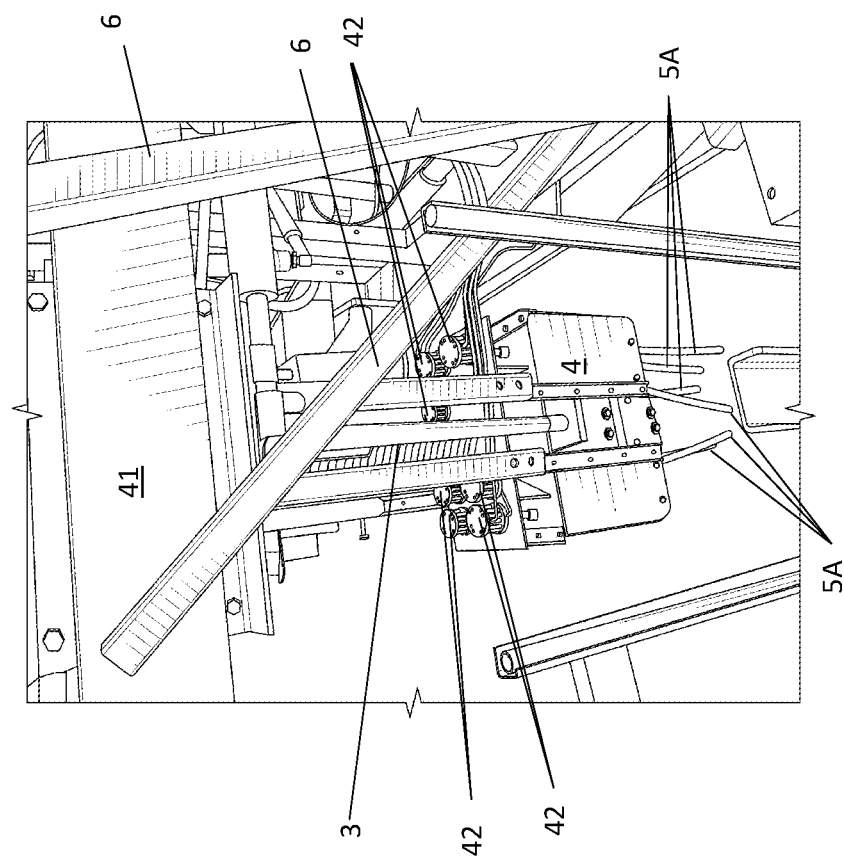
FIG. 7 is a drawing of a portion of the product delivery system of the disclosed device.
Figure 8:
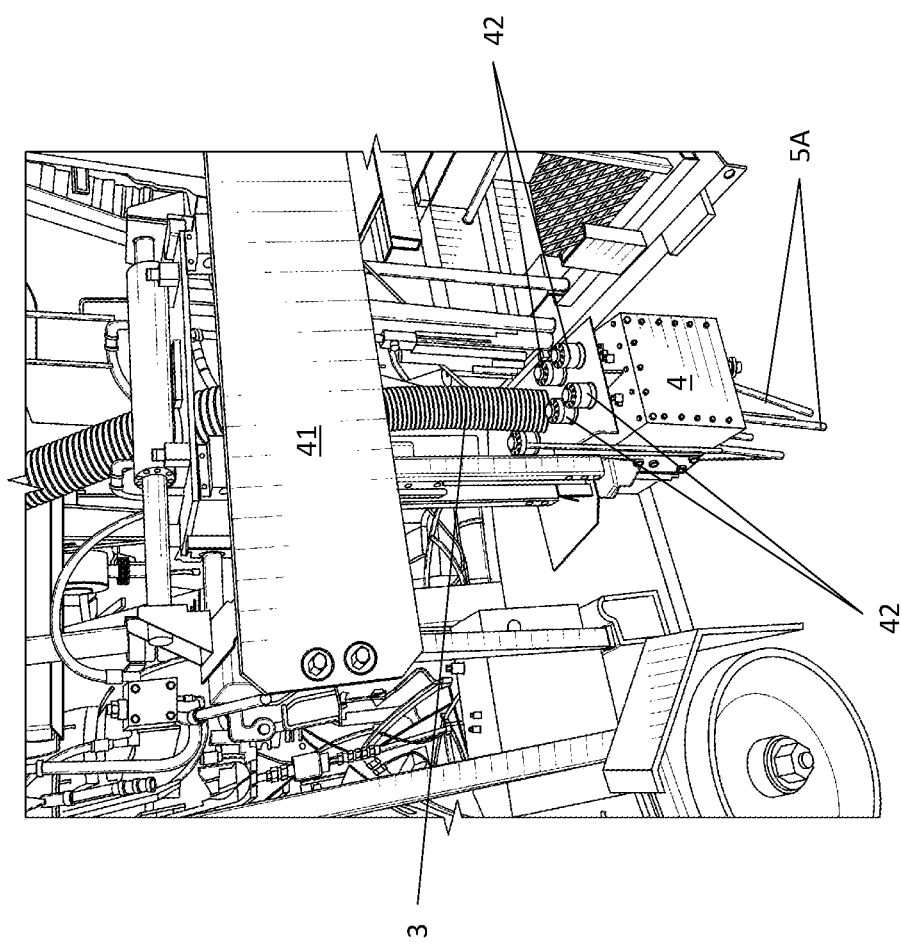
FIG. 8 is a drawing of a portion of the product delivery system of the disclosed device for filling spike holes from a right side view.
Figure 9:
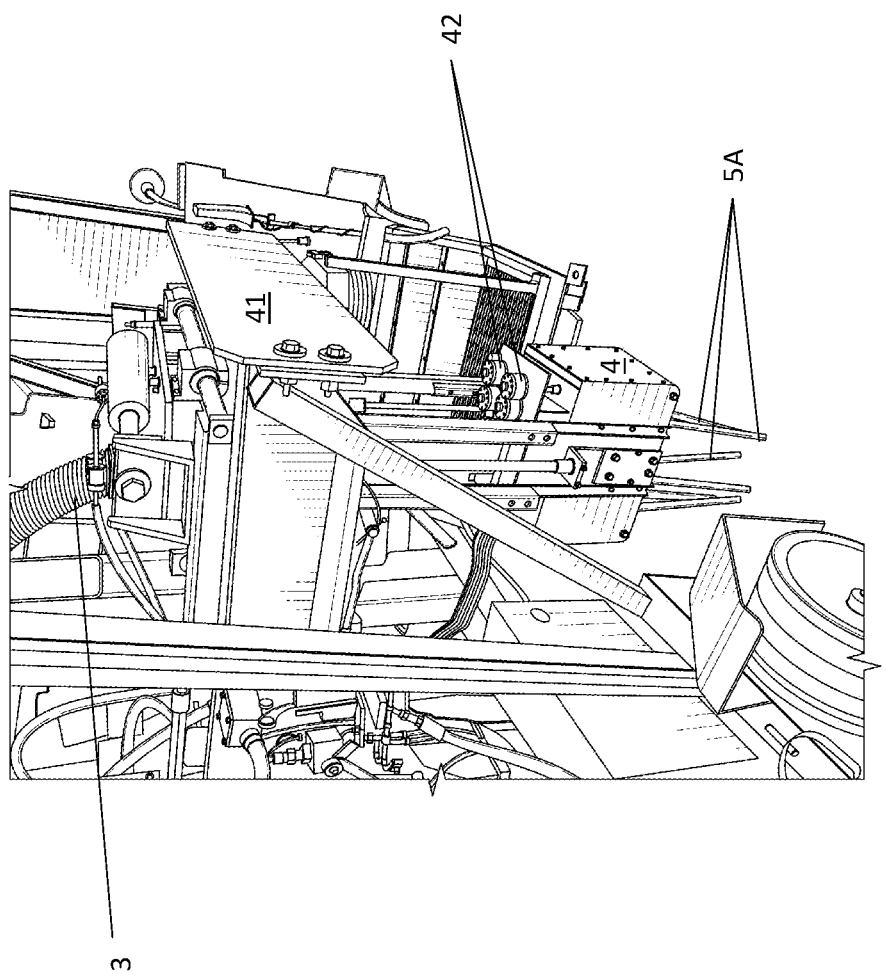
FIG. 9 is a drawing of a portion of the product delivery system of the disclosed device for filling spike holes from a front side view.

FIG. 7 is a drawing of the back view of a portion of the product delivery system of the disclosed device for filling spike holes. A frame system 6 holds the head unit 41 that attaches to the product distribution box 4. The product line 3 delivers the composition to the distribution box. Pneumatic control valves 42, six shown here but as many as eight in total in this example, control rods within the box (not shown) that move up and down allowing product to fall through the nozzles below (not shown) and into the delivery tubes 5A which may number as many as one, two, or as many as four, or as many as six, or as many as eight, or more as needed for rail spike configuration on a given rail line. FIG. 8 is a side view of the delivery system on the device with the head unit 41, product delivery line 3, product distribution box 4, pneumatic control valves 42, and delivery tubes 5A. FIG. 9 is a front side of the delivery system on the device with the head unit 41, product delivery line 3, product distribution box 4, pneumatic control valves 42, and delivery tubes 5A.

Figure 10:
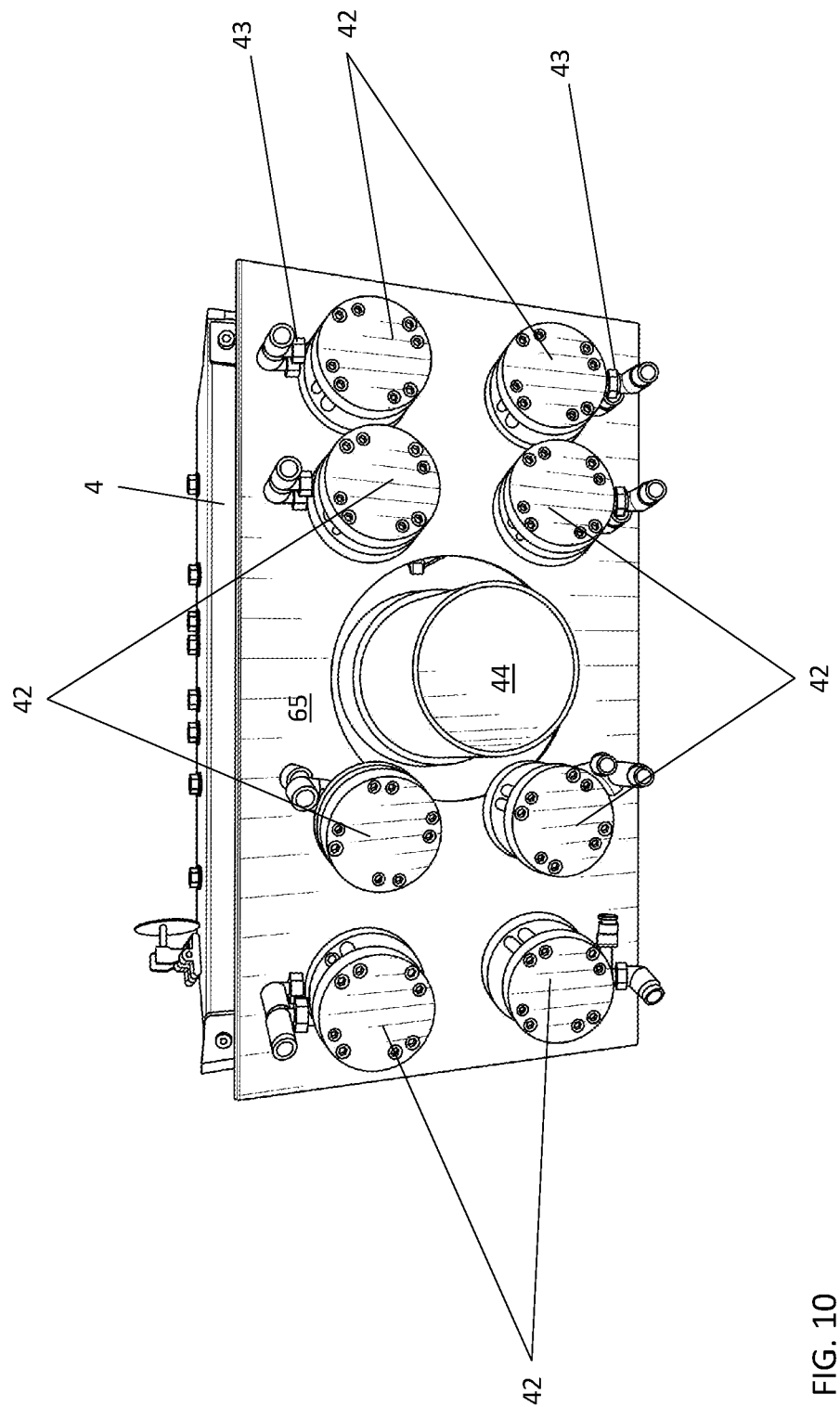
FIG. 10 is a drawing of a top-side view of a portion of the product delivery system of the disclosed device.
Figure 11:
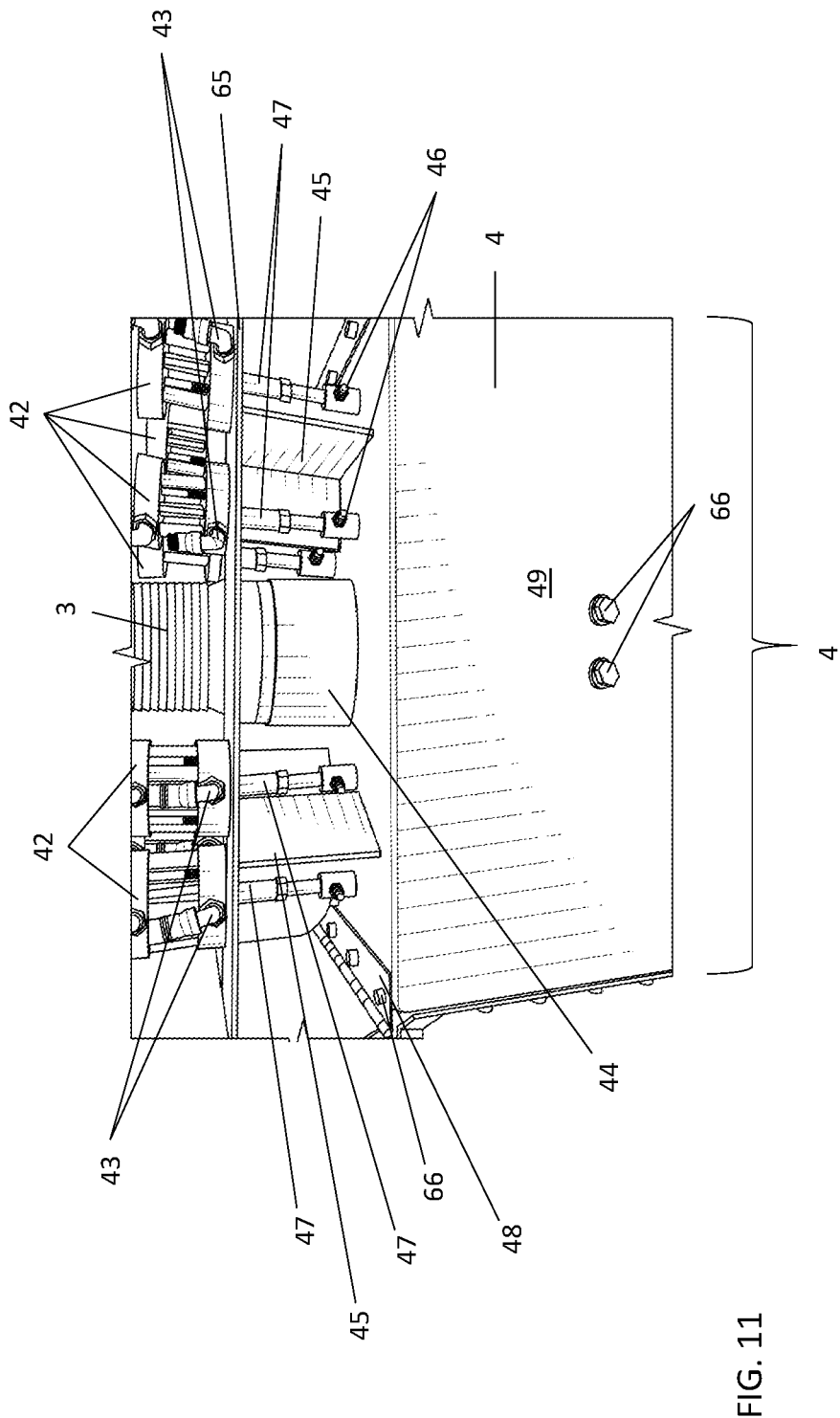
FIG. 11 is a drawing of a top-side view of a portion of the product delivery system of the disclosed device.

FIG. 10 is a drawing of a top-side view of a portion of the product delivery system of the disclosed device. A mounting plate 65 holds the pneumatic control valves 42 above the product distribution box 4. The product inlet 44 allows the filler composition to flow from the product delivery line (not shown) into the product distribution box 4. Rods within the box, described below, raise and lower via air or pneumatic fittings 43 to allow product to fall into the delivery tubes (not shown) and nozzles. FIG. 11 is a side view of a portion of the product delivery system. The product flows from the product delivery line 3 through the product inlet 44 into the product distribution box 4. The pneumatic control valves 42 lift product shaft rods 47 that allow product within the distribution box 4 to drop into the delivery tubes below (not shown). Product shaft rods 47 are supported and maintained by inlets 46 for greasing. The pneumatic control valves 42 which may number as few as one or as many as eight or more are supported by a spacer plate 45 and the mounting plate 65. A side panel 48 on the distribution box 4 may be hinged and opens to allow for cleaning. The front of the distribution box 4 is covered or comprised of a wall plate 49. These panels and walls may be held on the box or form the box and be attached via screws or bolts 66. One may contemplate other means of attachment such as hinges, nails, clips, or the like.

Figure 12:
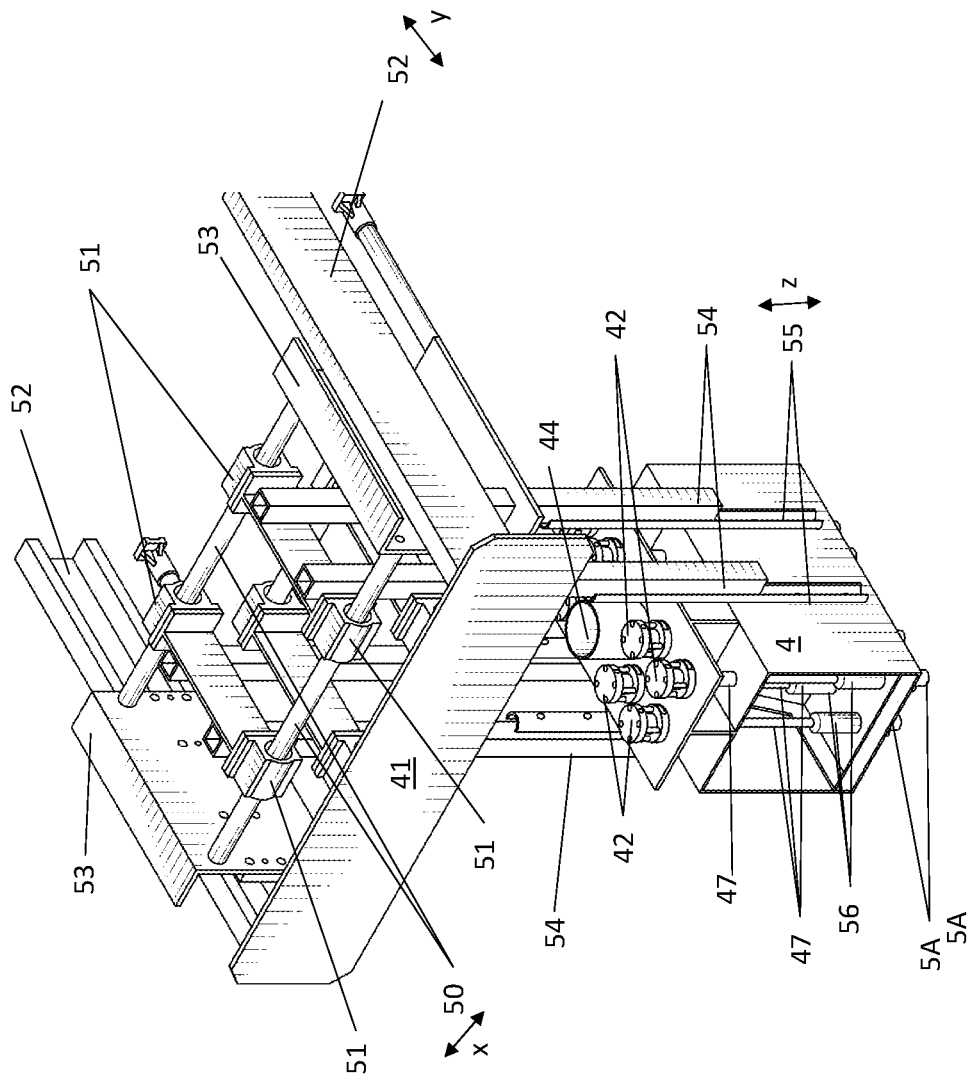
FIG. 12 is a portion of the product delivery system of the disclosed device.
Figure 13:
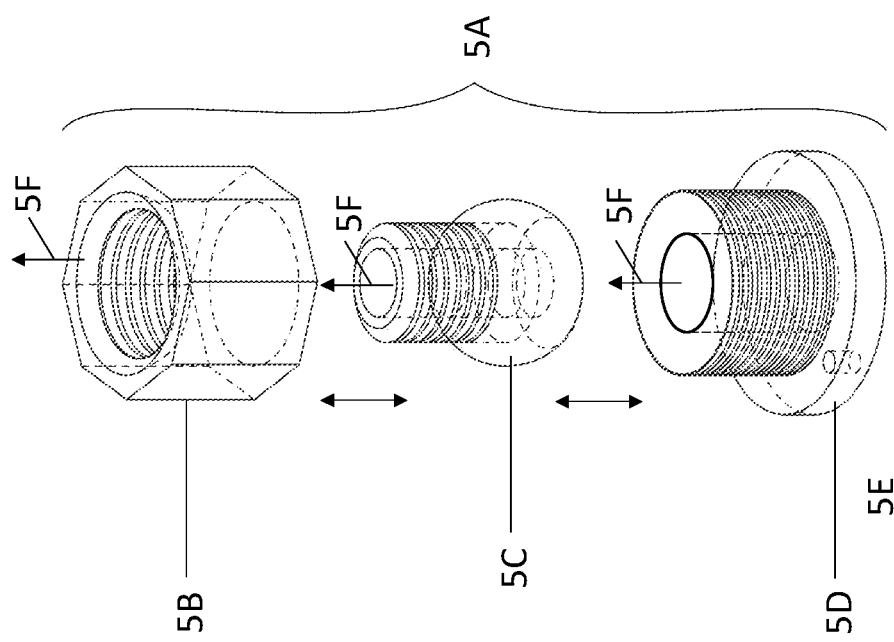
FIG. 13 is a schematic drawing of parts of the nozzles.

FIG. 12 is a top perspective view of the head unit 41 for the product distribution box 4. The side panel is not included or shown to allow visualization of the inner parts of the distribution box 4. The pneumatic control valves 42 lift the product shafts or rods 47 to allow product to enter the inner product transfer tubes 56, shown cut away here to show the product rods 47 that move up and down therein, and into the product dispensing nozzles 5A. Rods 47 may be lifted for varying amounts of time to allow more or less product to enter the product transfer tubes 56. This may be controlled by the pneumatic control valves 42 programmed or otherwise set by an operator. The head unit 41 is built and designed to move in the x, y, and z planes or directions allowing for control of where the distribution box is fixed over the rails and rail spike holes. The x axis rails 50 move within the x axis slide bushing 51. Likewise the y axis rails 52 move through the y axis barring rail 53. The z axis barring rails 54 move along the z axis movement rail 55. These movements are powered by the pneumatic system and controlled by the operator via the x, y, z head unit 41 controller (not shown). FIG. 13 is a schematic drawing of the product dispensing nozzles 5A including a nut 5B, tip 5C, and base 5D of the nozzle that fit together as indicated by the double-tipped arrows and to the bottom of the production distribution box (not shown) via one or more screws, rivets, bolts, or appropriate connector means 5E. The interior of each piece contains a hollow core for product to flow 5F through the nozzle 5A into the delivery tubes 5 (not shown) that attach to and/or fit snugly over the nut 5B.

Figure 14:
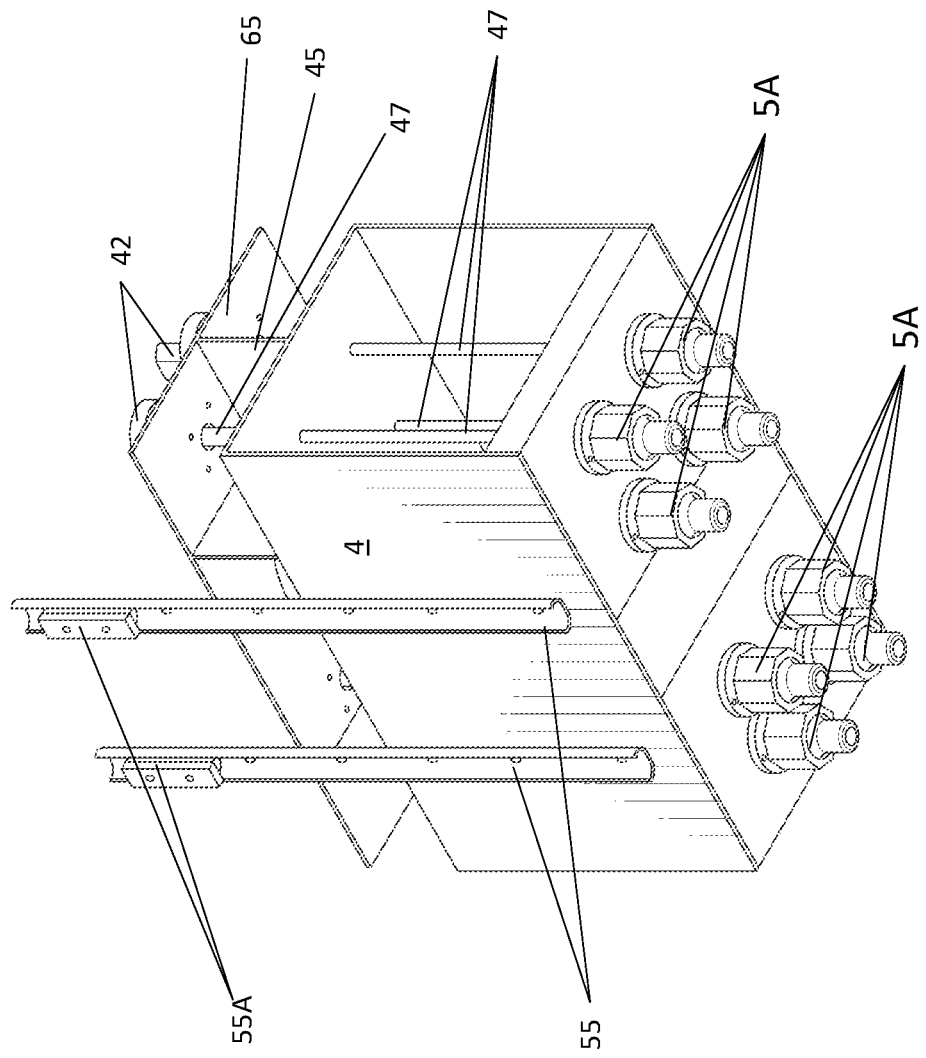
FIG. 14 is a back side perspective view of a portion of the product delivery system.
Figure 15:
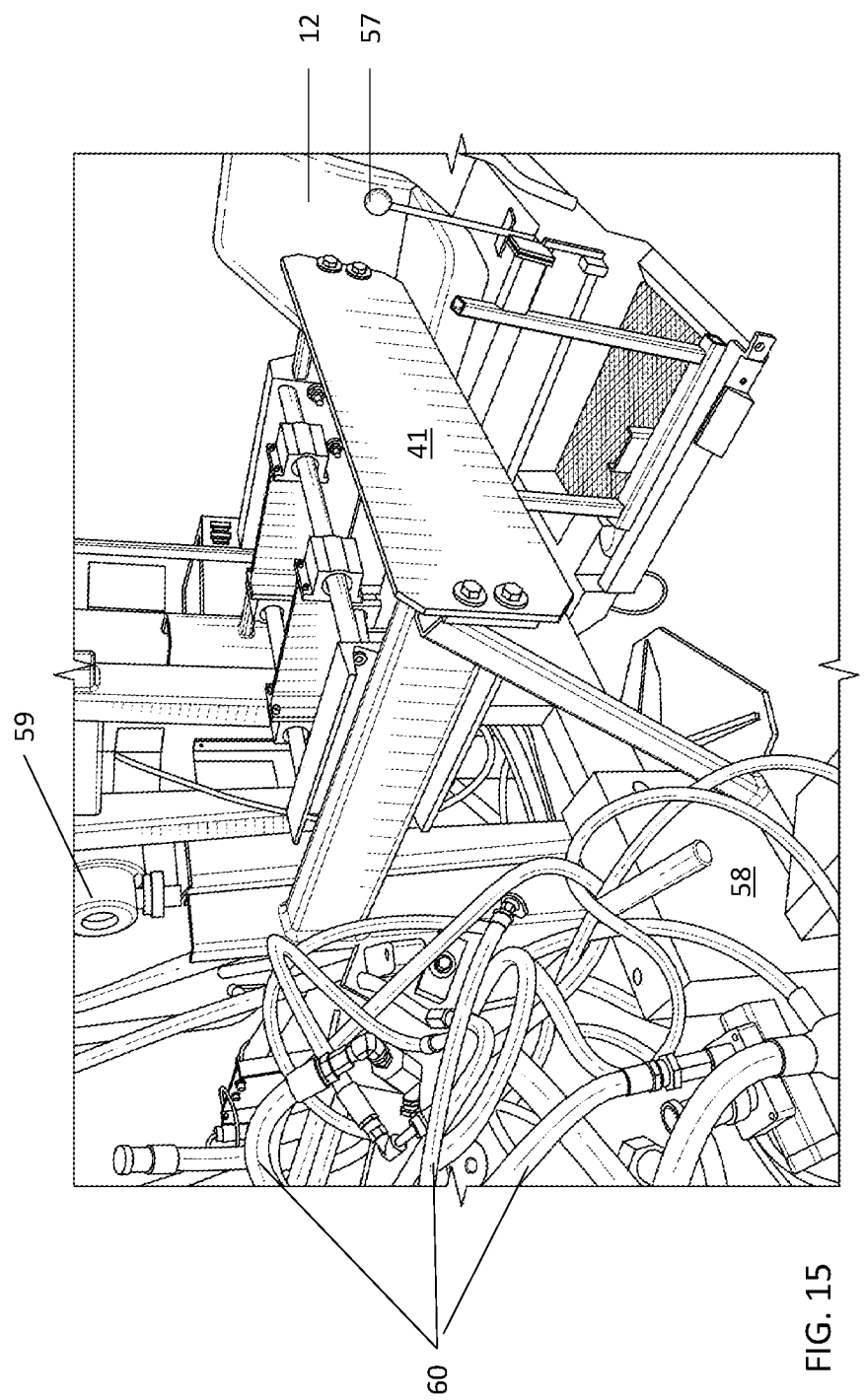
FIG. 15 is a close-up front side view of a portion of the disclosed device.

FIG. 14 is a bottom view of the product distribution box 4. The pneumatic control valves 42 may be controlled to move the product rods 47 up or down allowing or not allowing individually or separately product delivery to inner product tubes (not shown) and subsequently to the product delivery nozzles 5A. An operator may control the flow of product into the inner product tubes 56 via individual control of each pneumatic control valve and/or an electronic or software program may be implemented to set control of the valves 42. Also shown is the z axis movement rail 55 pieces and linear barring rails 55A for the z axis rail (not shown). The mounting plate 65 and shaft spacer plate 45 may be designed in many different manners to configure the pneumatic control valves 42 in different location or patterns depending on need for location of pneumatic control valves 42. Likewise the pattern or placement and number of the dispensing nozzles 5A may be altered to allow optimum placement of filler composition. FIG. 15 is a close-up front side view of a portion of the device. The head unit 41 for the product distribution box (not shown) sits in front of the operator chair. A forward and reverse lever 57 is included to move the vehicle forward or backward. Various hoses for air for the pneumatic and hydraulic systems are implemented to deliver pressured air or other needs to the appropriate parts.

FIG. 16 is a close-up back view of a portion of the disclosed device showing the operator chair 12 and controls for product delivery and vehicle control. An air system control panel or box 39 contains controls the pneumatic system. A second control panel or box 62 contains controls for the pneumatic control valves 42 for product dispensing. And a third controller 40 controls position of head unit in the x, y, and z directions or planes. The vehicle controller 57 controls forward and backward movement of the vehicle over the rails.

Figure 17B:
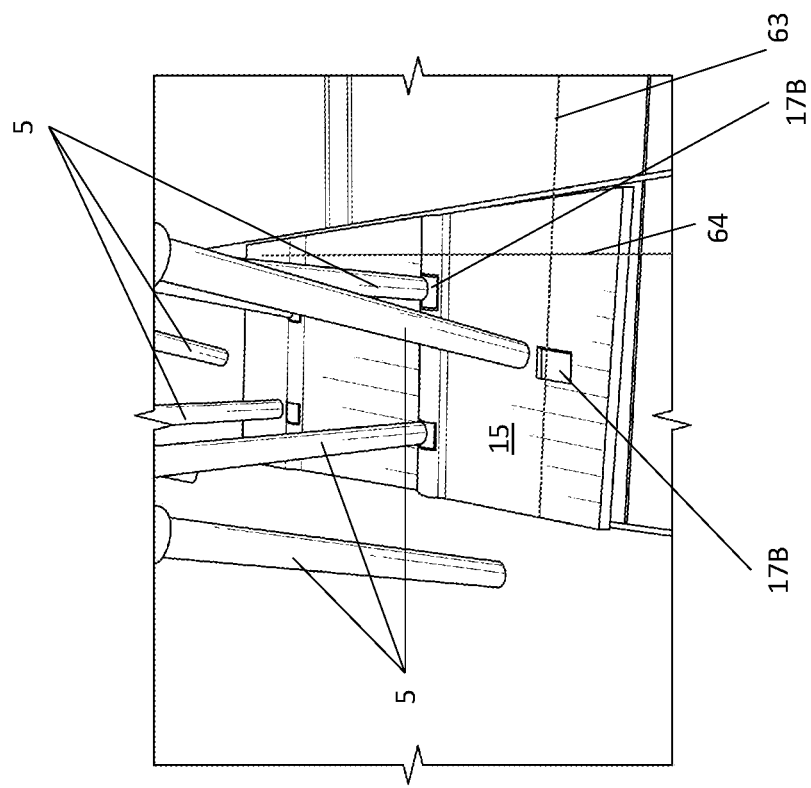
FIG. 17B is a close-up view of the product delivery tubes in use.
Figure 17A:
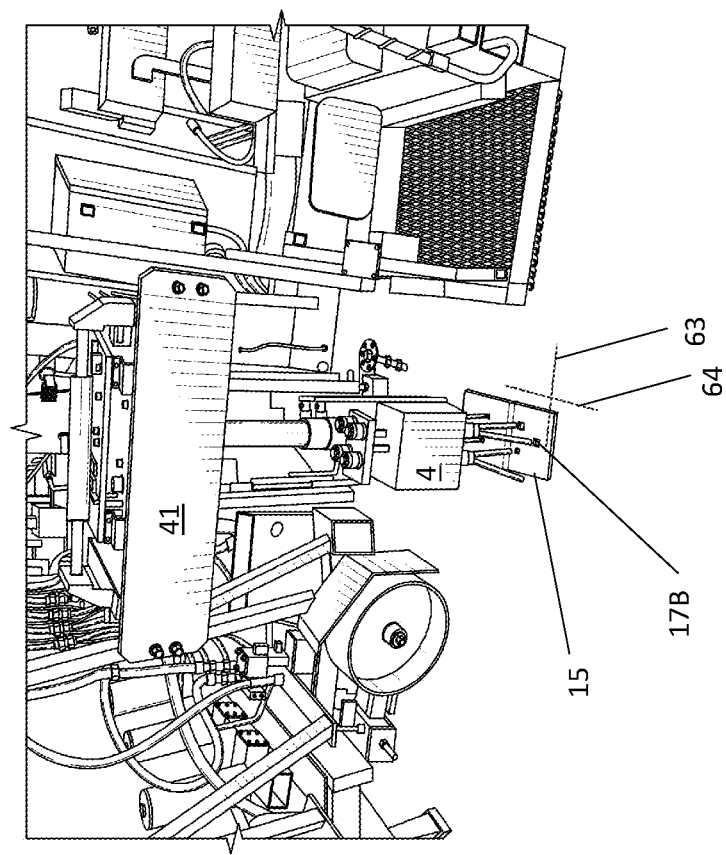
FIG. 17A is a side view of a portion of the product delivery device and system in use.
Figure 18:
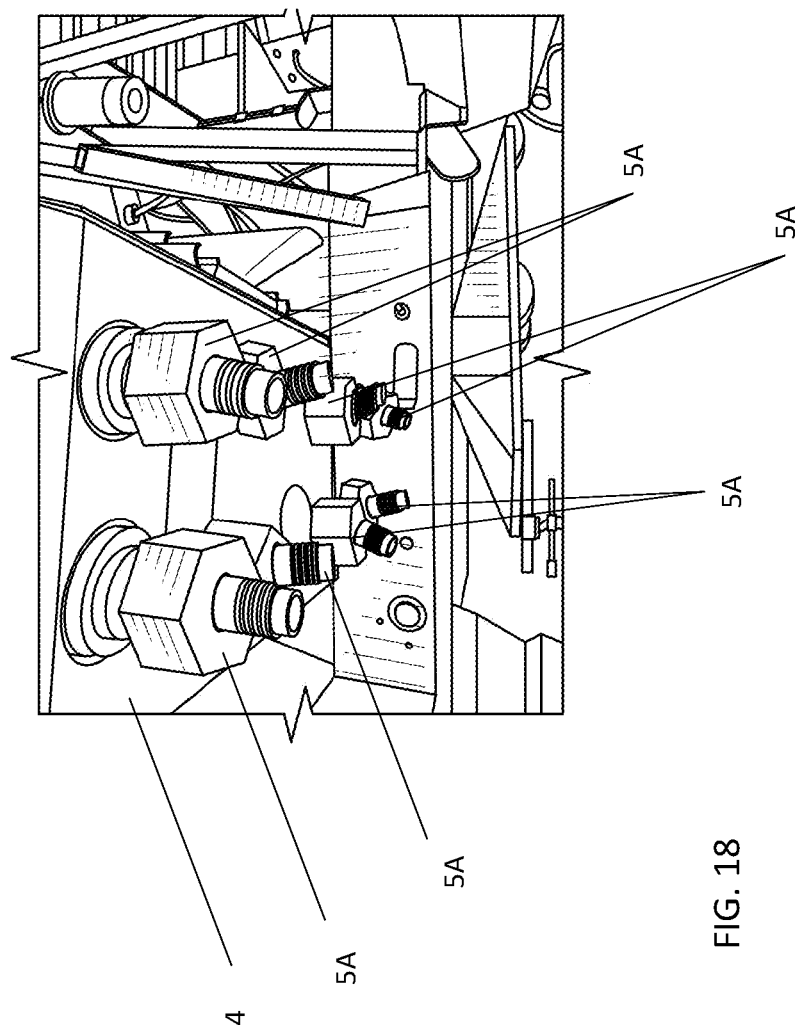
FIG. 18 is a close-up view of the product delivery nozzles.

FIG. 17A is a close-up view of a method for aligning product delivery tubes 5 with rail spike holes 17B. The unit is positioned over the rail plate 15 and a laser or other light source mounted on the device may be used to create an x cross hair line or axis 63 and y cross hair line or axis 64 to position the delivery tubes over the pattern of spike holes 17B on the rail tie plate 15. FIG. 17B is a further close-up of this process illustrating cross hairs 63, 64 created by a laser or light device aligning the delivery tubes 5 with the spike holes 17B. FIG. 18 is a close-up view of the dispensing nozzles 5A. These dispensing nozzles 5A are designed to swivel in their ports to better align delivery tubes (not shown) with spike holes. As such the dispensing or delivery nozzle 5A may swivel or angle at least 5°, 10°, or at least 15°, or at least 20°, or at least 25°, or at least 30°, or at least 35°, or at least 37° from a right angle with the bottom of the product distribution box 4 in any direction.

Further, a composition for filling holes, spaces, or gaps in wood is disclosed. The wood filler composition may be used in the process of repairing a railroad line in particular the railroad wooden cross or cross ties 16, as shown in FIG. 2, but may be applicable to other wood pieces where there is a need to stabilize and preserve the integrity of the wood member. Often wood cross ties 16 and rail spike holes 17B experience deterioration due to water, mold or other organisms, temperature, and other factors, and spikes 17A become loose. When spikes 17A become loose, rail lines move causing problems for trains. As illustrated in FIG. 2, the wood filler composition provides a medium in which a new or replacement spike 17C may be inserted or re-spiked into the hole 17B vacated by a rail spike 17A that mimics virgin wood ties. The wood filler composition comprises in part Gilsonite, also known as unintahite or asphaltum, and is a natural product being bitumen-impregnated rock or asphaltite primarily found in and mined from the Uintah Basin of Utah and Colorado. It is a naturally occurring solid non-aromatic hydrocarbon bitumen which is a non-carcinogenic composition. The wood filler composition may comprise Gilsonite at between about 15 to 60% by weight, or as much as 20 to 50% by weight, or as much as about 20%, or as much as 25%, or as much as about 30%, or as much as about 35% Gilsonite of the total composition. The wood filler composition may further comprise silica sand, wherein the sand particle shape may be angular in nature as opposed to a sphere-like particle structure or shape. The sand may rate on Mohs' Hardness Scale from about an H=2 to an H=10, or about an H=3 to about an H=9, or about an H=5 to an H=8, or about an H=5.5 to an H=7. The sand may be present in the composition from about 40% to about 85%, by weight, or about at least 60%, or about at least 70%. In addition, the composition may further comprise additives to prevent wood rot, some being water repellent compositions chosen, but not limited to those of the group including zinc, or a zinc compound, being in one example, zinc borate, and may be present in the composition at 1-10%, by weight, or about 2-8%, or about 2-5%. The composition may further comprise a wood preservative. It is one purpose of the present invention to provide an environmentally friendly solution to wood cross tie preservation. Older wood preservatives including chromated arsenicals, creosote, and pentachlorophenol have negative environmental impact. Newer environmentally friendly preservatives may include propiconazole, triadimefon, acid copper chromate, alkaline copper quaternary (ACQ), borate, copper azole, copper napthenate, copper-HDO (Bis-N-cyclohexyldiazeniumdioxy-copper), and polymeric betaine. The presently disclosed wood filler composition offers an improved environmentally friendly composition.

A method for filling holes in wood members is disclosed. As shown in FIG. 2, the wood filler composition is inserted into a wood member, like wood cross ties 16 in the rail spike 17B holes once the rail spikes 17A are removed, to stabilize the structure of the wood. Particularly, the wood filler composition described herein may be used in a method for railroad rail or cross tie repair. As noted before, rail spikes 17A hold the rail tie plates 15 to the wooden cross ties 16. As these rail spikes 17A become loose due to decomposition of the wood they need to be replaced. In the method of the present invention at least two holes may be filled with wood filler composition at one time, or three or four may be filled at one time, or five or six, or seven or eight, or more. In practice, once a rail spike 17A is removed, by hand or tools, the wood filler composition described herein is dispensed through the delivery tubes 5 simultaneously into each rail spike hole 17B by the disclosed device 1, FIG. 1, described above. Once the wood filler composition is placed in the holes, a new rail spike 17C may be inserted onto or in the composition filled hole.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

What is claimed is:

1. A method for treating a piece of wood to preserve it, the method comprising the steps of:
    a) creating a dry filler composition comprising unintahite and sand; and
    b) adding the dry filler composition into a hole in the wood.

2. A method for stabilizing a metal member in a piece of wood, the method comprising the steps of:
    a) creating a dry filler composition comprising unintahite and sand;
    b) adding the dry filler composition into a hole sized to receive the metal member; and
    c) placing the metal member in the hole.

3. The method of claim 2 further comprising adding a water repellant to the dry filler composition.

4. The method of claim 3, wherein the water repellant is zinc.

5. The method of claim 4, wherein the zinc makes up at least 2% of the dry filler composition.

6. The method of claim 3, wherein the water repellant is a zinc compound.

7. The method of claim 6, wherein the zinc compound makes up at least 1% of the dry filler composition.

8. The method of claim 7, wherein the zinc compound is zinc borate.

9. The method of claim 2, wherein the unintahite is from the Uintah Basin.

10. The method of claim 2, wherein the unintahite makes up at least 15% of the dry filler composition.

11. The method of claim 2, wherein the unintahite makes up at least 20% of the dry filler composition.

12. The method of claim 2, wherein the unintahite makes up at least 25% of the dry filler composition.

13. The method of claim 2 further comprising adding a wood preservative to the dry filler composition.

14. The method of claim 2, wherein the sand makes up at least 40% of the wood filler composition.

15. The method of claim 2, wherein the sand makes up at least 60% of the wood filler composition.

16. The method of claim 2, wherein the sand comprises sand particles and the sand particles are angular in shape.

17. The method of claim 2, wherein a hardness of the sand on a Mohs' Hardness scale is at least 5.

18. A method for replacing a spike in a railroad tie, the method comprising the steps of:
    a) removing the spike from the railroad tie thereby leaving a vacated hole;
    b) placing a composition in the vacated hole to create a composition filled hole, the composition comprising a dry filler composition, the dry filler composition comprising unintahite and sand; and
    c) driving a new spike into the composition filled hole.

19. The method of claim 18, wherein the dry filler composition further comprises a water repellant.

20. The method of claim 18 further comprising filling at least four vacated holes at one time with a device, the device comprising: a hydraulic system for moving an attached gravity fed product dispensing system in an x, y, and z direction, wherein the x, y, and z directions are orthogonal to each other; a dry product hopper comprising the dry filler composition; and the gravity fed dispensing system comprising a tube connecting the dry product hopper to a product vessel allowing the dry filler composition to fill the product vessel, at least four hydraulically powered dispensing units contained inside the product vessel, each of the at least four dispensing units comprising a rod controller, a rod, and a product tubing, wherein a raising of the rod by the rod controller allows the dry filler composition contained in the product vessel to flow into the product tubing; and at least four dispensing nozzles which are housed on the bottom of the product vessel and connected to the product tubing such that the dry filler composition flows via gravity into the product tubing and through the at least four dispensing nozzles such that the at least four vacated holes are filled at one time.

* * * * *